(12) United States Patent
Li

(10) Patent No.: US 6,591,285 B1
(45) Date of Patent: Jul. 8, 2003

(54) RUNNING-SUM ADDER NETWORKS DETERMINED BY RECURSIVE CONSTRUCTION OF MULTI-STAGE NETWORKS

(76) Inventor: Shuo-Yen Robert Li, Flat 7B, Residence 9, The Chinese University of Hong Kong, Shatin, NT (HK)

( * ) Notice: Subject to any disclaimer, the term of this patent is extended or adjusted under 35 U.S.C. 154(b) by 458 days.

(21) Appl. No.: 09/716,574

(22) Filed: Nov. 20, 2000

Related U.S. Application Data (60) Provisional application No. 60/212,333, filed on Jun. 16, 2000.

(51) Int. Cl.[7] .................................................. G06F 7/50
(52) U.S. Cl. ........................................ 708/670; 370/411
(58) Field of Search ................................ 708/670, 200; 370/411

(56) References Cited

U.S. PATENT DOCUMENTS

| | | | |
|---|---|---|---|
| 4,813,038 A | 3/1989 | Lee | 370/60 |
| 5,034,946 A | * 7/1991 | Smith | 370/411 |
| 5,274,642 A | * 12/1993 | Widjaja et al. | 370/411 |
| 5,506,712 A | * 4/1996 | Sasayama et al. | 370/478 |
| 5,987,028 A | * 11/1999 | Yang et al. | 370/380 |

OTHER PUBLICATIONS

"The Design and Analysis of an ATM Multicast Switch with Adaptive Traffic Controller", Byun and Lee, IEEE/ACM Trans. on Networking, vol. 2, No. 3, Jun. 1994, pp. 288–298.

* cited by examiner

*Primary Examiner*—Tan V. Mai
(74) *Attorney, Agent, or Firm*—John T. Peoples (57) ABSTRACT

A technique for physically implementing a running sum adder network and configuring the concomitant adder network of elements. A $2^{k+1} \times 2^{k+1}$ adder network has the size $2^{k+2}-k-3$ and depth $2k+1$; thus the adder network achieves a very good balance between the measures of size. The adder network utilizes a systematic design method based upon a recursive construction algorithm.

20 Claims, 13 Drawing Sheets

RUNNING-SUM ADDER NETWORKS DETERMINED BY RECURSIVE CONSTRUCTION OF MULTI-STAGE NETWORKS

CROSS-REFERENCE TO RELATED APPLICATION

This application is a non-provisional application of provisional application Ser. No. 60/212,333 filed Jun. 16, 2000.

BACKGROUND OF THE DISCLOSURE

1. Field of the Invention

This invention relates generally to the configuration of running-sum adder networks and, more particularly, to a methodology for systematically selecting, subject to given constraints, elements composing the adder networks to thereby physically realize the adder networks.

2. Description of the Background Art

A running-sum adder physically realizes, for a given sequence of numbers $x_0, x_1, \ldots, x_{M-1}$, the summations $$\sum_{i=0}^{j} x_i$$

for each j, with $0 \leq j \leq M$. More specifically, the $j^{th}$ running sum of the given sequence is $x_0+x_1+ \ldots +x_j$. If an initial value y is present, the $j^{th}$ running sum is then defined as $y+x_0+x_1+ \ldots +x_j$.

The problem of determining the running-sum is usually encountered when designing network switches/routers, computers or computer networks. A running-sum adder is a device which was devised to compute the running-sum. A running-sum adder can be found in concentrators in which the adder is used as a counter to count the number of active packets prefixed to a switching network. It can also be found in a copy network to help replicating packets, such as disclosed in U.S. Pat. No. 4,813,038 issued to Lee.

The running-sum adder may readily be implemented with finite memory. However, in computers or switching networks with distributed architecture, it is desirable to have a distributed solution as well. Now the problem becomes one of finding an efficient distributed solution—the meaning of the term "distributed" is discussed below once certain terminology is introduced.

Figure 1:
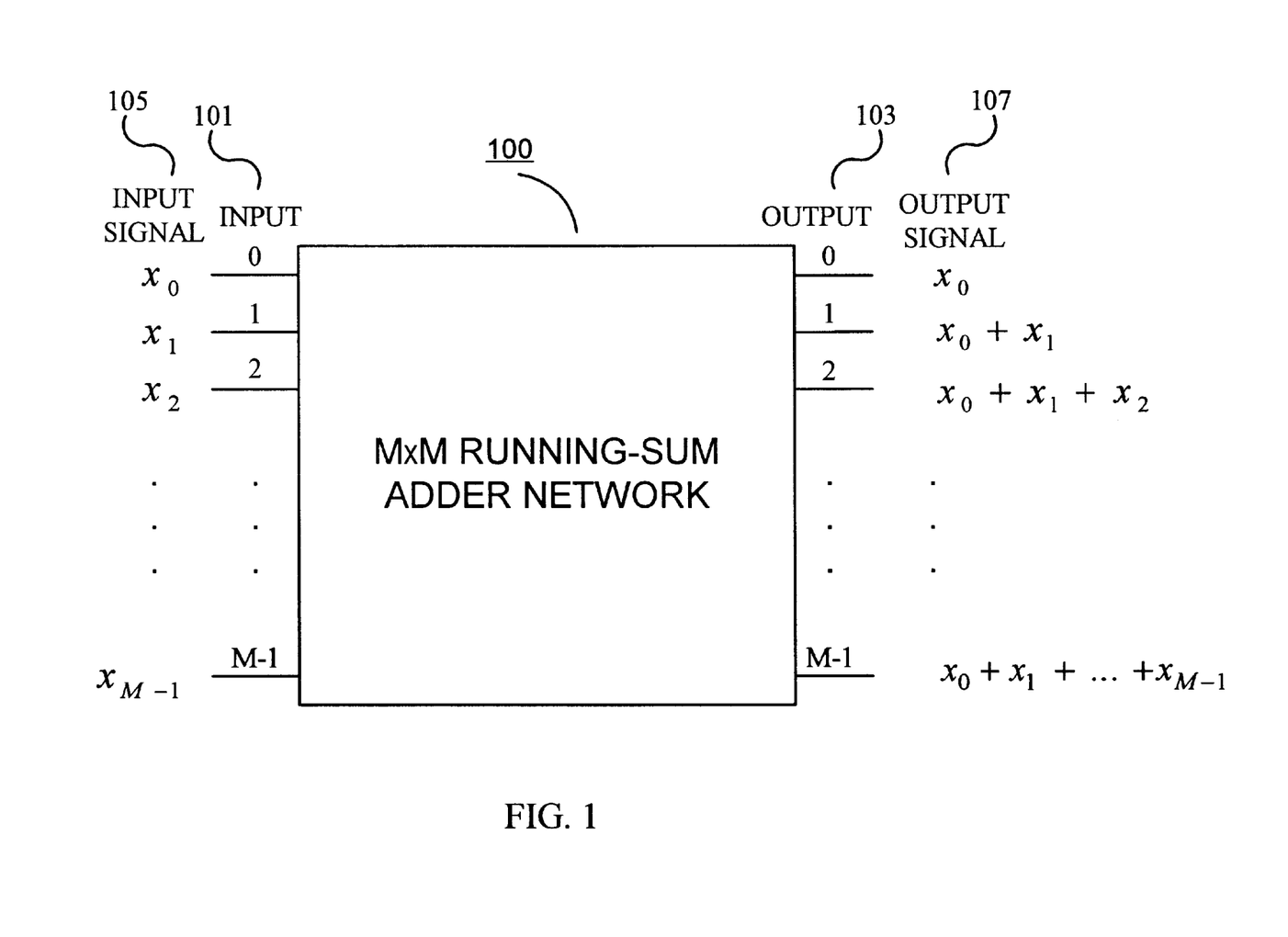
FIG. 1 shows a generic M×M running-sum adder network.

With reference to FIG. 1, generic M×M distributed running-sum adder network 100 (or, synonymously, "adder network") is a network with an array of M external inputs (101) (or simply called inputs when referring to the whole adder network), a number of interconnected primitive elements of unidirectional transmission (usually including addition elements, fan-out elements, and delay elements, as described later), and an array of M external outputs (103) (or outputs when referring to the whole adder network). To facilitate the description, both the M inputs and M outputs of the adder network have been labeled with 0, 1, 2, ..., and M−1 from top to bottom. The task of the adder network is that, when each input i is given a signal $x_i$ (105), then adder network 100 performs the corresponding calculation in a distributed fashion such that all outputs generate the results simultaneously, where each output j outputs a signal $y_j$ representing the sum of input signals $x_0, x_1, \ldots x_j$ (107). The calculation is distributed in the sense that each primitive element performs its calculation or operation locally (that is, only based on its local input(s) and generates the output signal(s) at its local output(s)) without having to know the information at any other parts of the network.

Conventionally, there are several techniques to implement a running-sum adder network. The techniques differ mainly at the internal connectivity of the primitive elements in the network. When comparing the different implementations, typically two measures are considered, namely: the size, which is the number of adder elements in the network (in some other contexts, the number of fan-out elements is also counted; however, in this immediate context, the cost of a fan-out element is much less than that of an adder element, so fan-out elements need not be accounted for); and the depth, which is the number of stages of the network. More specifically, the number of stages of a network is the maximum number of adder elements or delay elements on any path for a signal to traverse from an input to an output of the adder network. In practice, the depth of the adder network corresponds to the computational time in a parallel computation environment, whereas the size represents the amount of hardware required.

Figure 2:
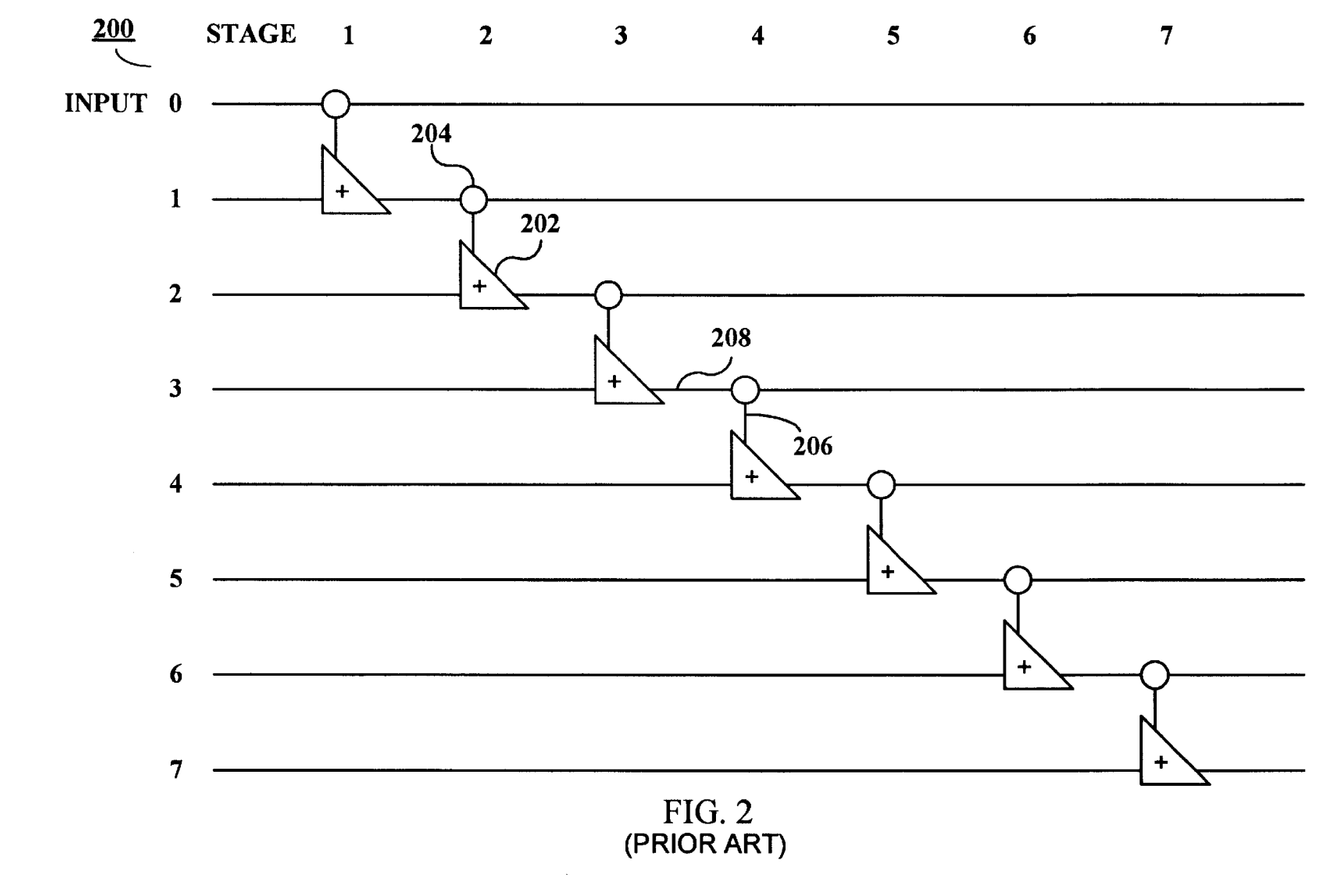
FIG. 2 provides an example of an 8×8 running-sum adder network using a conventional serial design.

One simple implementation of the running-sum adder network—referred to as the serial implementation—has the minimum size at the cost of depth. Its size is M−1, but its depth is also M−1. With reference to FIG. 2, there is shown a serial implementation of an 8×8 running-sum adder network with only seven 2×1 adder elements (202) and 1×2 fan-out elements (204). In network 200, the running-sum computation is not synchronous. The input of the lower 2×1 adder element (206) receives the computed running-sum from the output of the upper 2×1 adder element (208). The arrangement of network 200 is such that the depth of the implementation increases linearly with the dimension of the adder network, which would incur significant delay for large running-sum adder networks.

Figure 3:
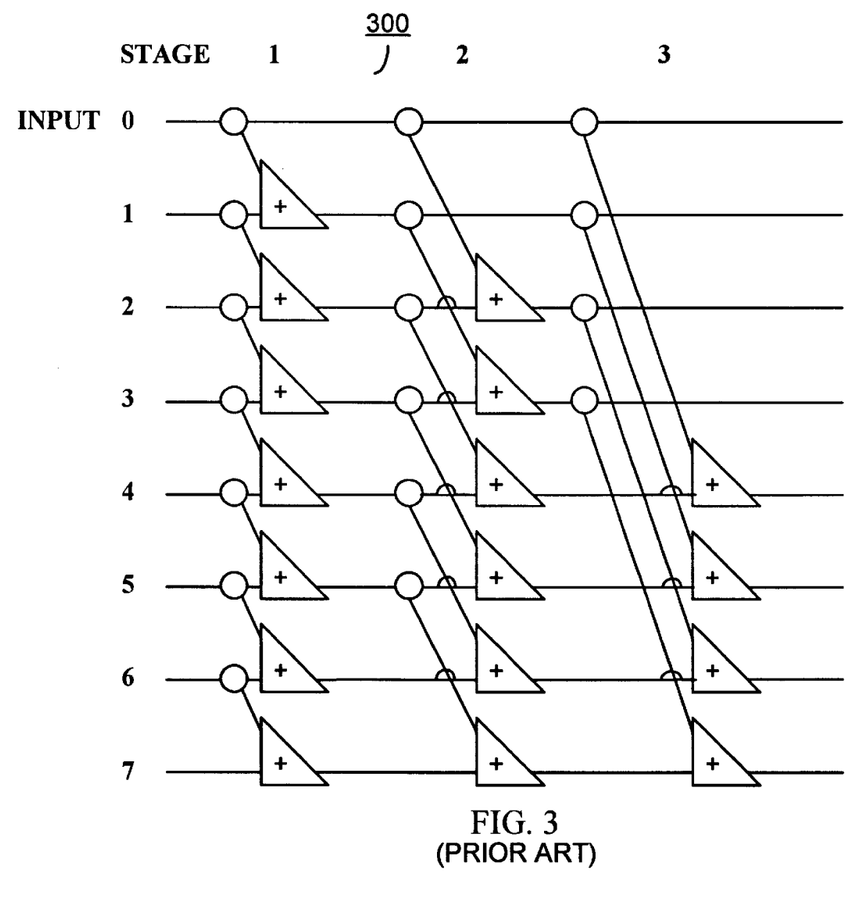
FIG. 3 provides an example of an 8×8 running-sum adder network using a conventional parallel design.

On the other hand, it is not difficult to find a network with depth exactly equal to $\lceil \log_2 M \rceil$. Such a design—referred to as the parallel design—has the minimum possible depth, when the fan-out elements are not counted. However, this recursive construction yields a network of size $\Omega(M \lceil \log_2 M \rceil)$ (where $\Omega$ means "upper-bonded by the order of"). With reference to FIG. 3, there is shown network 300 of sample of size 8×8. In this implementation, at the output of stage 1, the running sum of the signal at output j is $x_j[1]=x_j+x_{j-1}$; at the output of stage 2, the running sum is $x_j[2]=x_j[1]+x_{j-2}[1]=x_j=x_{j-1}+x_{j-2}+x_{j-3}$; thus the signals at the output of the adder network is $x_j[\log_2 M]=x_j+x_{j-1}+ \ldots +x_0$.

Another example of a running-sum adder network is disclosed in U.S. Pat. No. 4,813,038 ('038) briefly alluded to earlier. The network of '038 is also a parallel design of size $\Omega(M \lceil \log_2 M \rceil)$. More specifically, the longest chain of signal progression in this M×M network has a length $M+\log_2 M$. This is a lower bound on the signal propagation delay through the network, regardless of the implementation. Moreover, if the implementation is one that maintains signal synchronization across each stage of elements, the bit time would have to be long enough to cover the signal propagation time through N/2 adders. This implies a bit rate proportional to 1/N times the bit rate allowed by individual element. Accordingly, this severely limits the speed of the network.

Clearly, the serial design is simpler than the parallel one and it does provide significant hardware savings. However, the former incurs considerable computational time because of its serial operations.

The art is devoid of teachings and suggestions whereby the network is a balance in the sense that the network exhibits properties of both small size and low latency by recursive interconnection of smaller adder networks. Thus, a need exists in the art for a systematic procedure to configure a running-sum adder network given the size and depth requirements. As part of this procedure, it is necessary to obtain a tractable, effective solution that gives the desired balanced result.

SUMMARY OF THE INVENTION

These shortcomings and other limitations and deficiencies are obviated in accordance with the present invention by a method, and concomitant circuitry, to systematically and efficiently physically realize a running-sum adder network based upon a meritorious balance between size and depth.

In accordance with the broad aspect of the present invention, a method is set forth for physically implementing running-sum adder network. The method includes the steps of (1) systematically selecting, based upon a prescribed mathematical algorithm, elements to physically realize the network, the algorithm being determined to satisfy the requirements of size and depth, and (2) interconnecting the selected elements to realize the network.

A preferred method for realizing a $2^{k+1} \times 2^{k+1}$ running-sum adder network having 2k+1 stages includes: (a) logically stacking two $2^k \times 2^k$ adder networks vertically resulting in a first logical network having have $2^{k+1}$ lines and 2k−1 stages; (b) logically horizontally splitting the first logical network into two halves, k−1 stages on the left and k stages on the right, and then inserting two stages in-between the two halves, resulting in a second logical network having $2^{k+1}$ lines and 2k+1 stages; and (c) physically inserting k+1 adder elements at (x, $2^k$) and k+1 fan-out elements at (x, $2^k - 2^{x-1}$) where x=1, 2, . . . , k+1, respectively, and then connecting an output of each inserted fan-out element with an input of each inserted adder element in the same stage.

In accordance with preferred circuitry, a $2^{k+1} \times 2^{k+1}$ running-sum adder network having $2^k+1$ stages includes:
  (a) two $2^k \times 2^k$ adder networks stacked vertically resulting in a first sub-network having have $2^{k+1}$ lines and 2k−1 stages,
  (b) two stages in-between two parts of the first sub-network, the parts obtained by splitting the first sub-network into k−1 stages on the left and k stages on the right, resulting in a second sub-network having $2^{k+1}$ lines and $2^{k+1}$ stages,
  (c) k+1 adder elements at (x, $2^k$) of the sub-network and k+1 fan-out elements at (x, $2^k - 2^{x-1}$) of the second sub-network, where x=1, 2, . . . , k+1, respectively, with an output from each k+1 fan-out element being connected to an input of each k+1 adder element in the same stage.

As a primary feature, the subject matter of the present invention engenders a balance between the two extremes (one with small size but high latency and the other with low latency but large size). On one hand, according to the design methodology, the size of an M×M adder network is only about 2M when compared with $\Omega(M\lceil \log_2 M \rceil)$. As the size increases linearly with M, it is a great savings when M is large. On the other hand, its depth is on the order of $\log_2 M$ and, therefore, is much shorter when compared with the serial implementation. Accordingly, it is especially cost-effective for those applications that require a large running-sum adder with small latency. Moreover, its design is also simple. In addition, it can be constructed recursively from the smaller adder networks.

In general, a $2^{k+1} \times 2^{k+1}$ running-sum adder is composed of two $2^k \times 2^k$ adder networks, plus k+1 pairs of 2×1 adder elements and 1×2 fan-out elements. The size of such a multi-stage network is just $2^{k+2} - k - 3$ and the depth is 2k+1.

Moreover, recursive construction improves the structural modularity of the adder network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of this invention can be readily utilized in providing a running-sum adder network.

1. Running-sum Adder Network Terminology in Accordance With the Present Invention To facilitate the description and reiterate what has been alluded to earlier with respect to FIG. 1, an M×M adder network with k stages is labeled with horizontal and vertical coordinates. The vertical coordinates 0,1, . . . , and M−1 correspond to the M horizontal lines of the network, from top to bottom. The horizontal coordinates 1, 2, . . . , and k correspond to the k stages, from left to right. Each primitive element (discussed immediately below) is located at one particular stage and on one particular line. The element located at stage x and on line y is labeled with the coordinate (x,y) or, in shorthand, is described as being located at (x,y).

The details of the primitive elements are now described:

(a) 2×1 Adder Element

Figure 4:
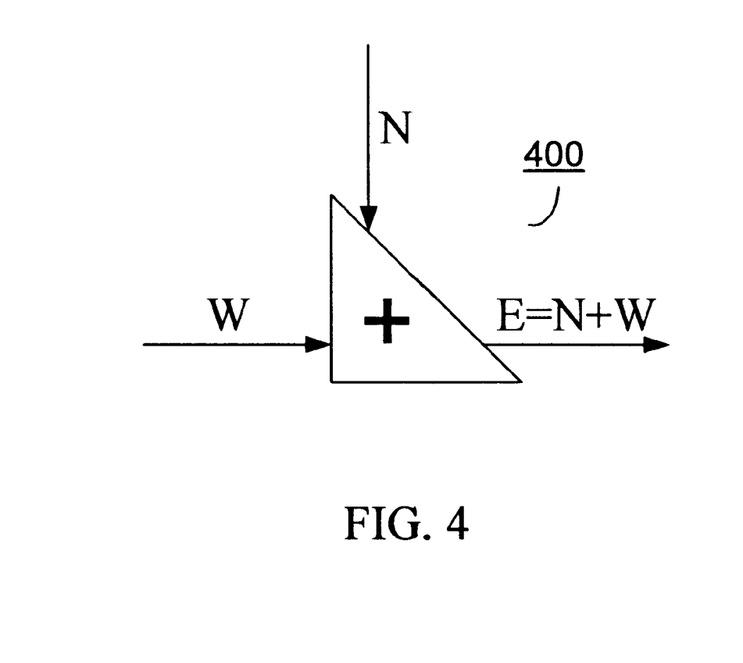
FIG. 4 illustrates a 2×1 adder element.

The primitive adder element is the main building block of the adder network. As illustrated in FIG. 4, 2×1 adder element 400 is a device with two inputs and one output. The two inputs are labeled as W and N (conceptually, Western and Northern), respectively, and the output is labeled as E (conceptually, Eastern). The output signal at E is the sum of input signals at W and N. The simplest implementation of a 2×1 adder element is bit-pipelining with each number expressed in a stream of bits in increasing significance.

(b) 1×2 Fan-out Element

Figure 5:
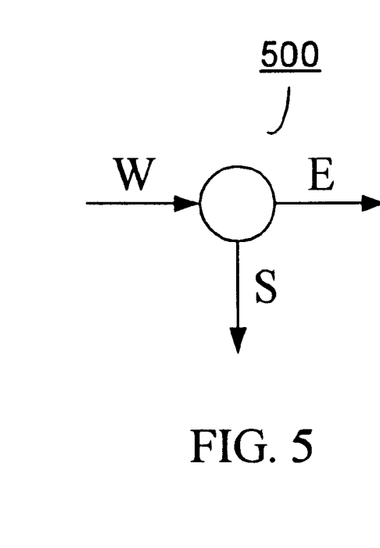
FIG. 5 illustrates a 1×2 fan-out element.

The primitive fan-out element is used to replicate the signals. As illustrated in FIG. 5, 1×2 fan-out element 500 has one input and two outputs. The sole input is labeled as W, and the two outputs are labeled as E and S, respectively. The output signals at E and S are the replications of the input signal at W. A fan-out element can be implemented simply by a wired connection. However, when many of fan-out elements are cascaded together, signal regeneration/amplification might be required for adequate power drive.

(c) 1×1 Delay Element

The primitive delay element is inserted at the intersections of stages and horizontal lines of the adder network where no adder or fan-out elements are present. They are used to maintain synchronization but, because this element is not central to the inventive subject matter, this element is not shown in the figures for the sake of clarity.

2. Recursive Construction of the Adder Network

The algorithm for recursive construction and then the final implementation of the running-sum adder network according to the principles of the present invention is described in herein. It is noted from the outset that the adder networks described here are those with the number of inputs/outputs being integral power of 2. It is also instructive to note that the ultimate outcome of the recursive construction method is the final implementation of the running-sum adder; accordingly, the constructions involved in all iterations and steps before reaching the final implementation are just logical. Only the final resulting adder network is physically realized.

The inventive running-sum adder network can be designed recursively in the following way. First, conceptually build the 4×4 network by two 2×2 networks plus two pairs of adder and fan-out elements, and then the 8×8 network by two 4×4 networks plus three pairs of adder and fan-out elements, and so on. In general, a $2^{k+1} \times 2^{k+1}$ adder network can be constructed from two $2^k \times 2^k$ adder networks plus k+1 pairs of adder and fan-out elements. A generic recursive iteration includes 3 steps:

Step 1: Given two $2^k \times 2^k$ adder networks. Stack the two $2^k \times 2^k$ adder networks vertically. The resulting first logical network or sub-network has $2^{k+1}$ lines and 2k−1 stages;

Step 2: Horizontally split the resulting logical network into two halves, k−1 stages on the left and k stages on the right, and insert 2 stages in between. The resulting second logical network or sub-network will now have $2^{k+1}$ lines and 2k+1 stages;

Step 3: Place k+1 adder elements at (x, $2^k$) and k+1 fan-out elements at (x, $2^k - 2^{x-1}$), where x=1, 2, ... ,k+1, respectively, and then connect the S-output of the fan-out element with the N-input of the adder element in the same stage.

A $2^{k+1} \times 2^{k+1}$ adder network constructed in this way is of size $2^{k+2} - k - 3$ (i.e., the number of adder elements) and has 2k+1 stages (i.e., the depth).

3. Examples

Two examples, k=1 and k=3, are used to illustrate the recursive iterations.

(a) k=1

Figure 6:
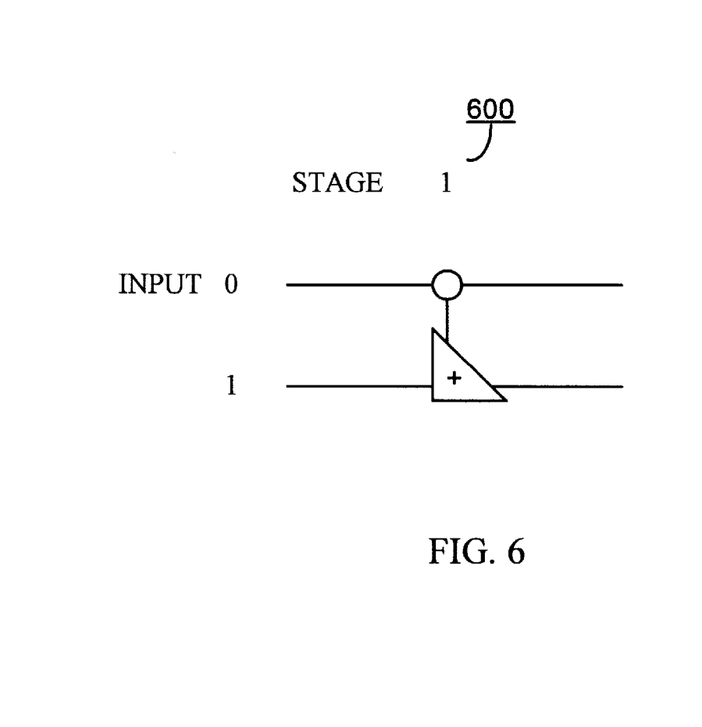
FIG. 6 illustrates a 2×2 running-sum adder network which is the basic block of constructing larger adder network.
Figure 7:
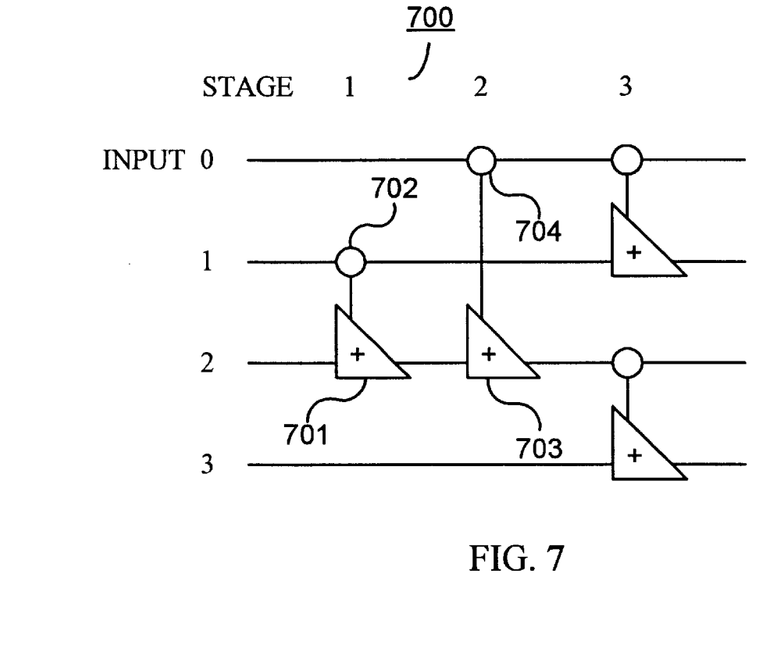
FIG. 7 illustrates a 4×4 running-sum adder network constructed from 2×2 adder networks using recursive construction scheme disclosed in this invention.

The 2×2 adder network is the smallest one—it has 2 lines and 1 stage, as shown by network 600 in FIG. 6. According to step 1, two 2×2 adder networks are stacked vertically. According to step 2, there is a 0 stage (nothing) on the left and 1 stage (the original one and only one stage) on the right. Then two more stages are inserted in between such that there are now three stages and the original stage becomes the third stage. Finally, according to step 3 and as depicted by 4×4 adder network 700 of FIG. 7, two adder elements (701, 703) are both placed on line 2, but at stage 1 and 2 respectively. Two fan-out elements (702, 704) are placed at line 1, stage 1 and line 0, stage 2, respectively. The S-output of each new fan-out element is connected to the N-input of the new adder element in the same stage.

(b) k=3

Figure 8:
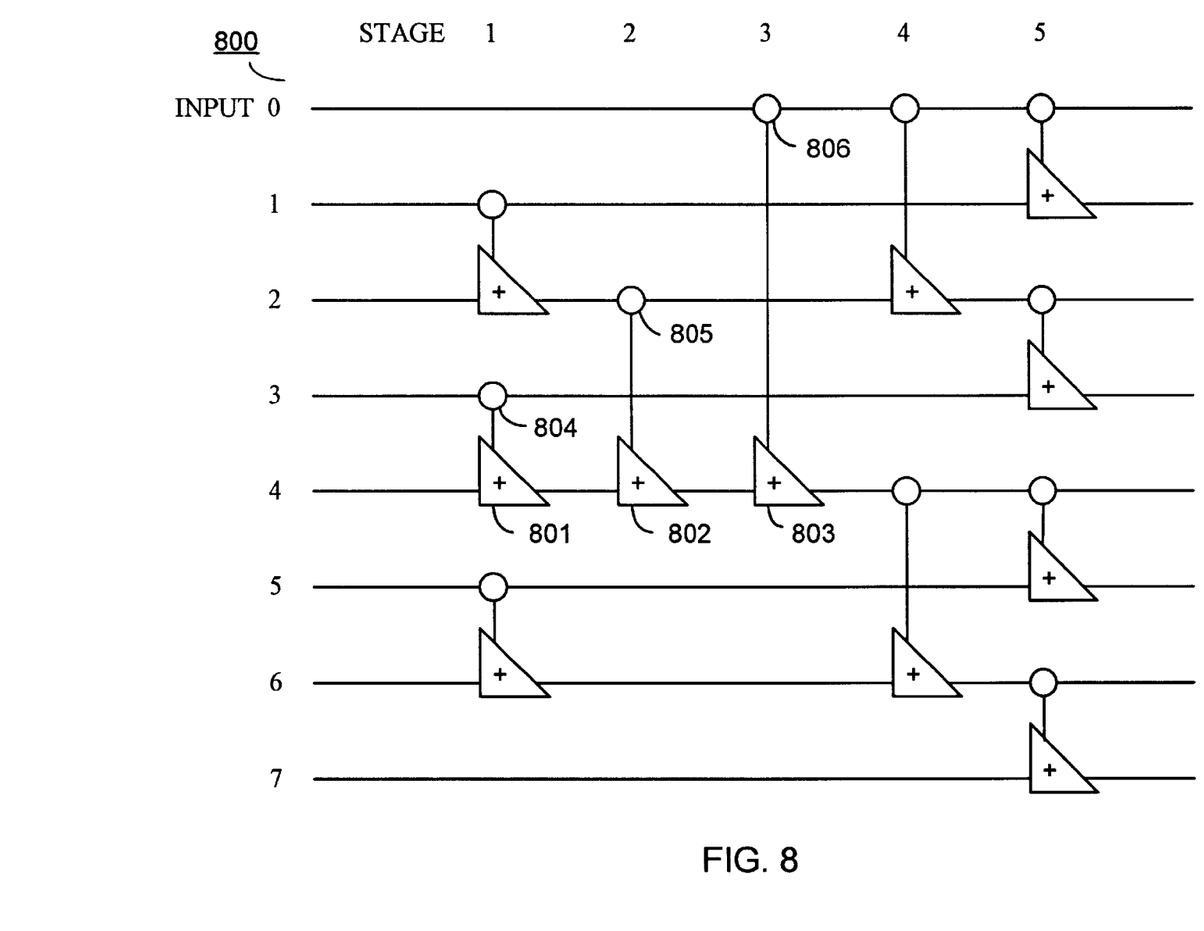
FIG. 8 illustrates an 8×8 running-sum adder network constructed from 4×4 adder networks using recursive construction scheme disclosed in this invention.
Figure 9:
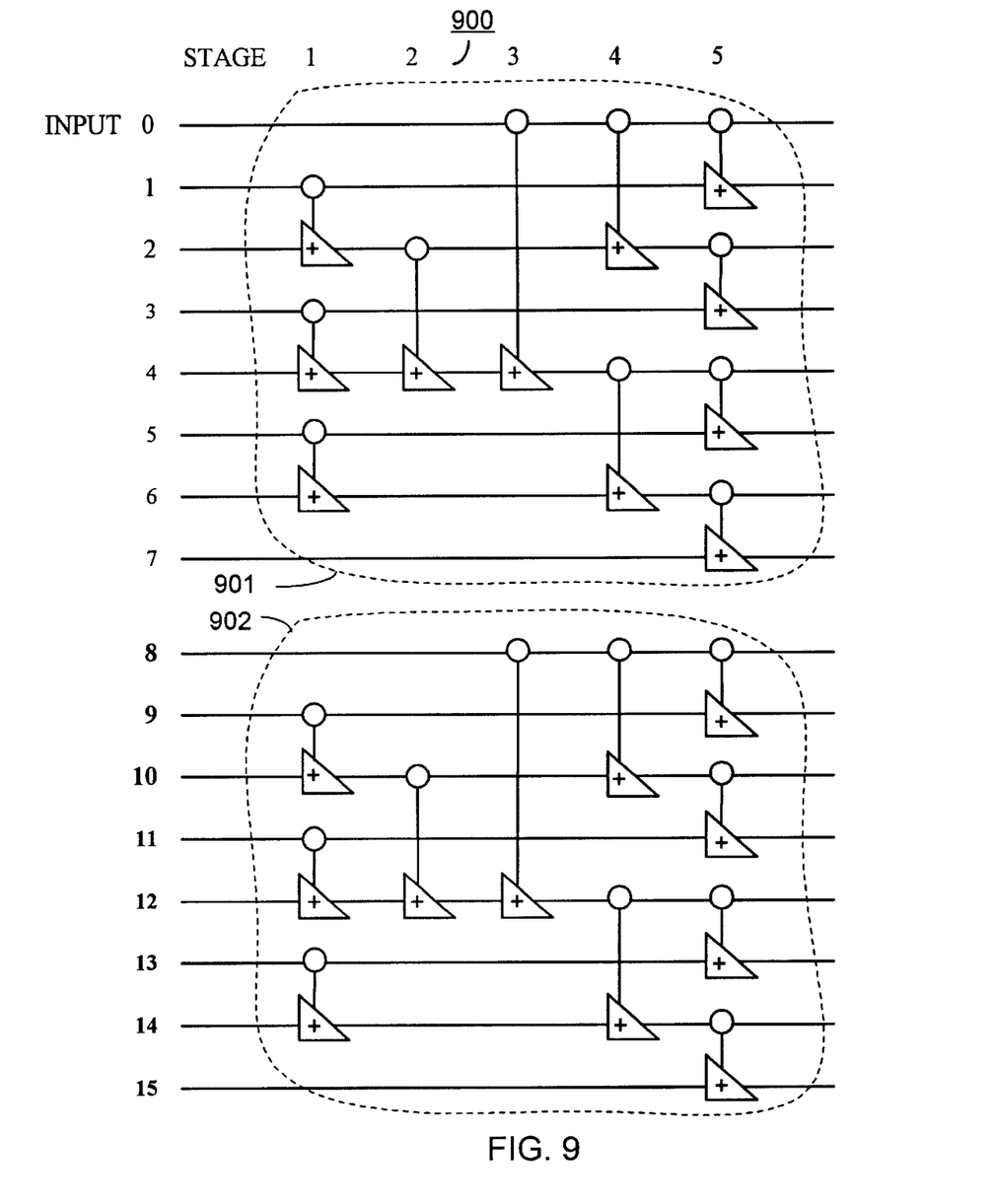
FIG. 9 shows the step 1 of the recursive construction of 16×16 running-sum adder network from 8×8 adder network.
Figure 10:
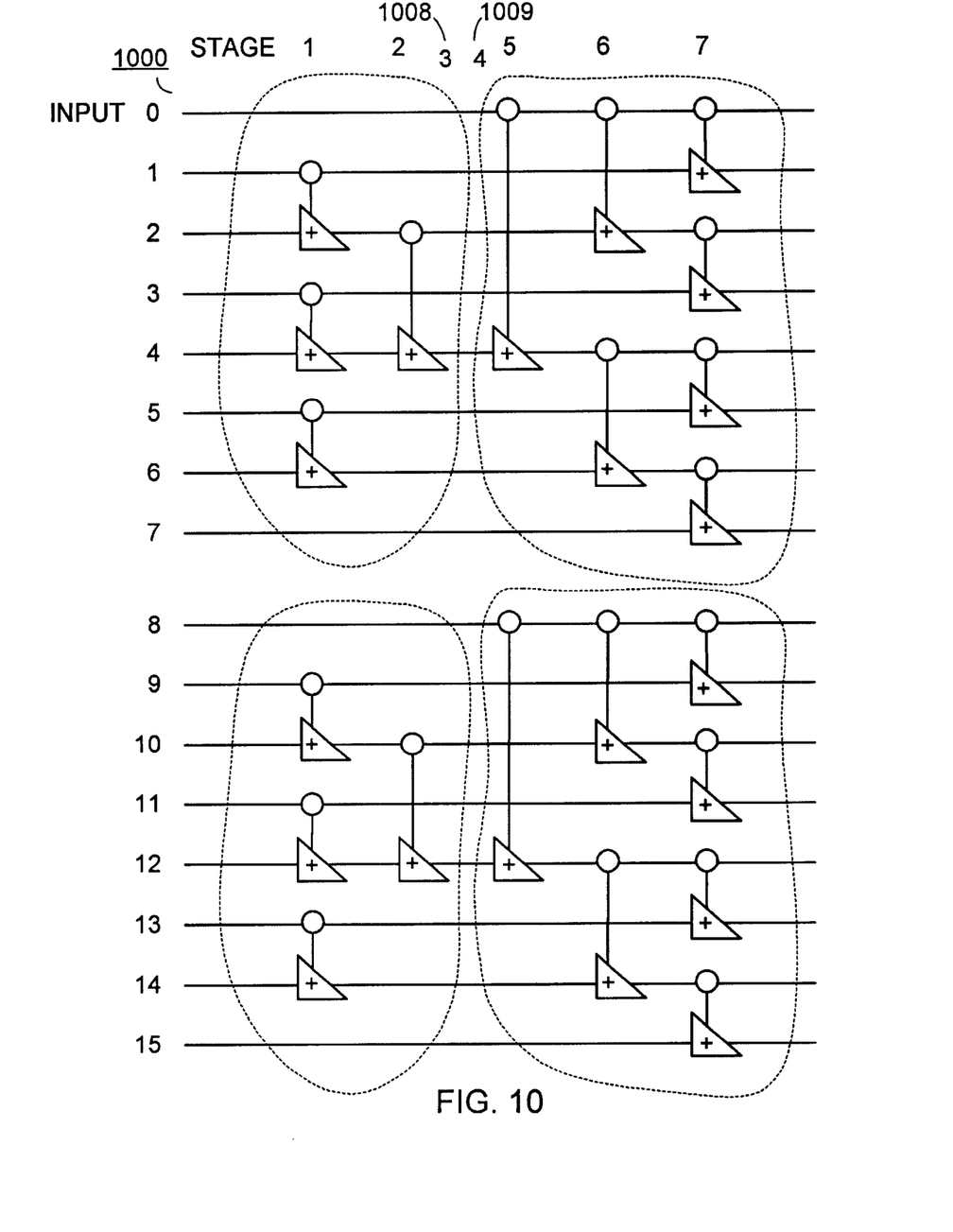
FIG. 10 shows the step 2 of the recursive construction of 16×16 running-sum adder network from 8×8 adder network.
Figure 11:
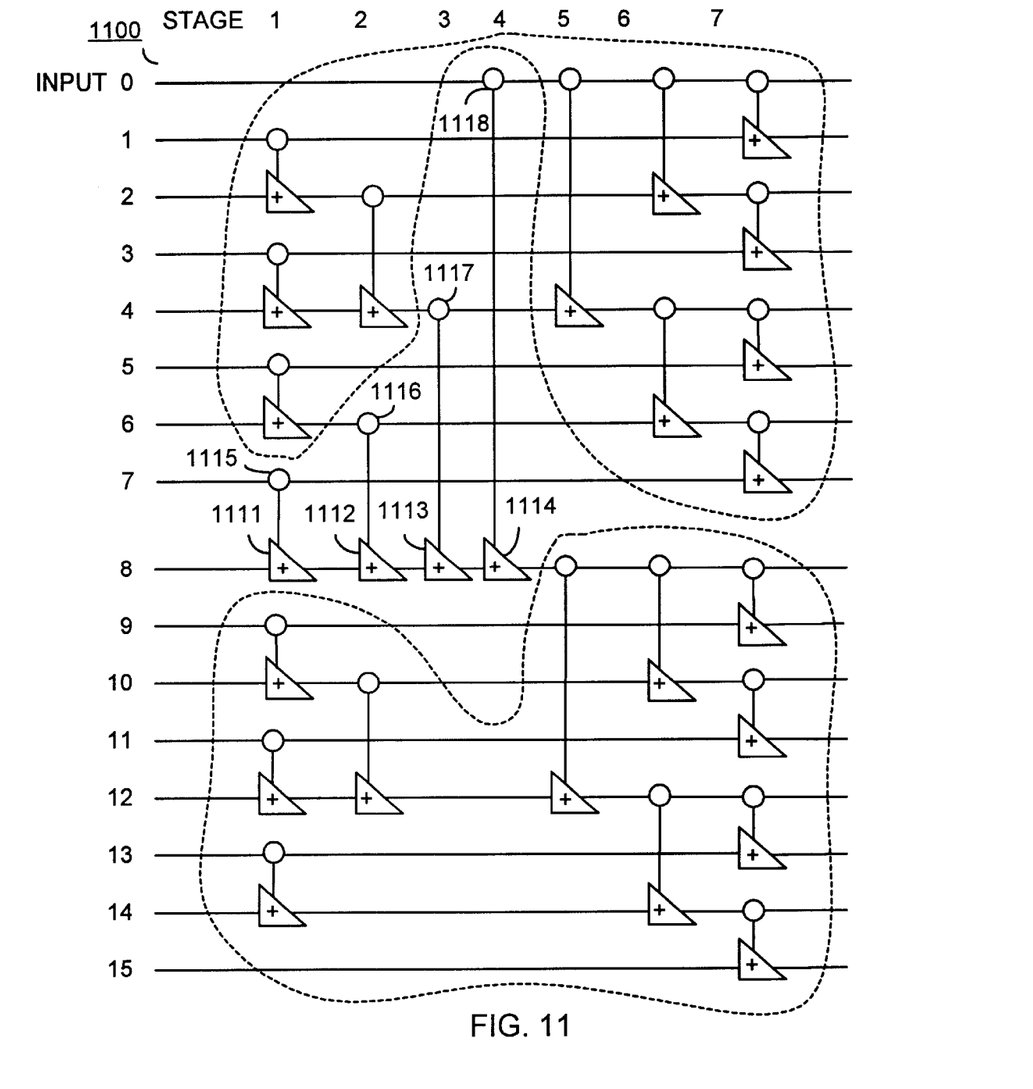
FIG. 11 shows the step 3 of the recursive construction of 16×16 running-sum adder network from 8×8 adder network.

As another example, it is demonstrated how a 16×16 adder network is built from two 8×8 adder networks. An 8×8 adder network 800 is illustrated in FIG. 8. According to step 1 and as depicted by network 900 of FIG. 9, two 8×8 adder networks (901, 902) are stacked vertically to form a network with 16 lines and 5 stages. With reference to network 1000 of FIG. 10, two more stages (1008, 1009) are inserted in between original stage 2 and 3 as stated in step 2. Then according to step 3, as shown by network 1100 in FIG. 11, four adder elements (1101, 1102, 1103, 1104) are placed at (1,8), (2,8), (3,8) and (4,8), and four fan-out elements (1105, 1106, 1107, 1108) at (1,7), (2,6), (3,4) and (4,0). Finally, vertically connecting the four pairs of adder and fan-out elements will give the required 16×16 adder network.

3. Construction of Adder Network With Arbitrary Number of Inputs/Outputs

If a $(2^k+j) \times (2^k+j)$ adder network is required, the simplest method is that a $2^{k+1} \times 2^{k+1}$ adder network is constructed (logically) first and then the upper $2^k - j$ lines and the associated elements are removed. More specifically, whenever a line is removed, all primitive elements located on this line, as well as all those adder elements not on this line but whose N-inputs are connected to the S-outputs of those fan-out elements located on the removed line will also be removed. Whenever a stage has no any adder or fan-out elements, this stage can be removed as well. It is noted that removing the lower $2^k - j$ lines also works. However, removing upper lines always yields a network with fewer stages and primitive elements than the case of removing lower lines.

Figure 12A:
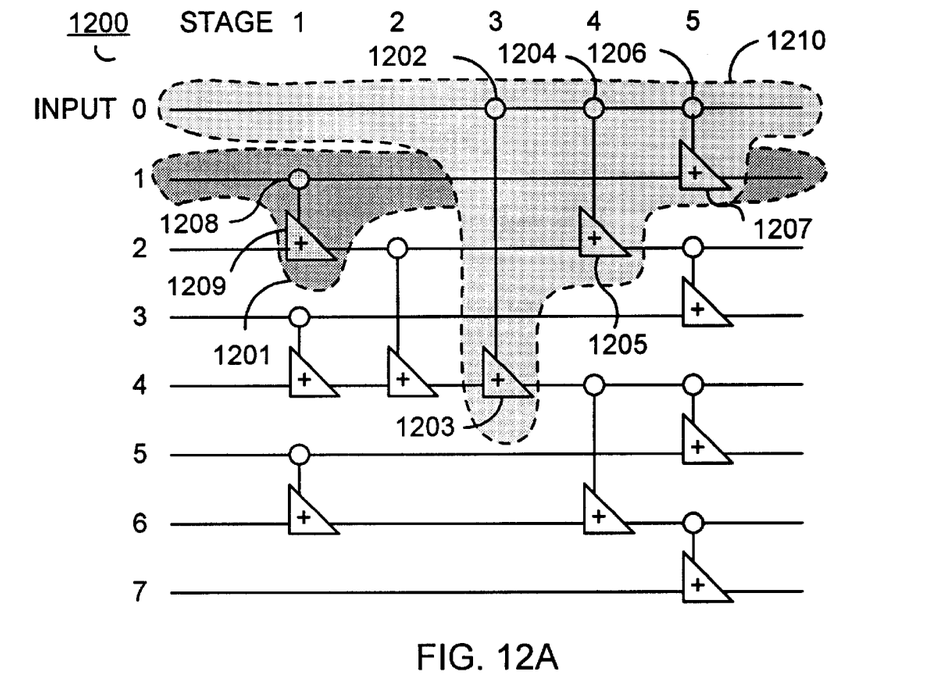
FIG. 12 illustrates how an M×M running-sum adder network is constructed when M is not an integral power of 2 and is an arbitrary integer for a 6×6 running-sum adder network constructed from 8×8 adder network.
Figure 12B:
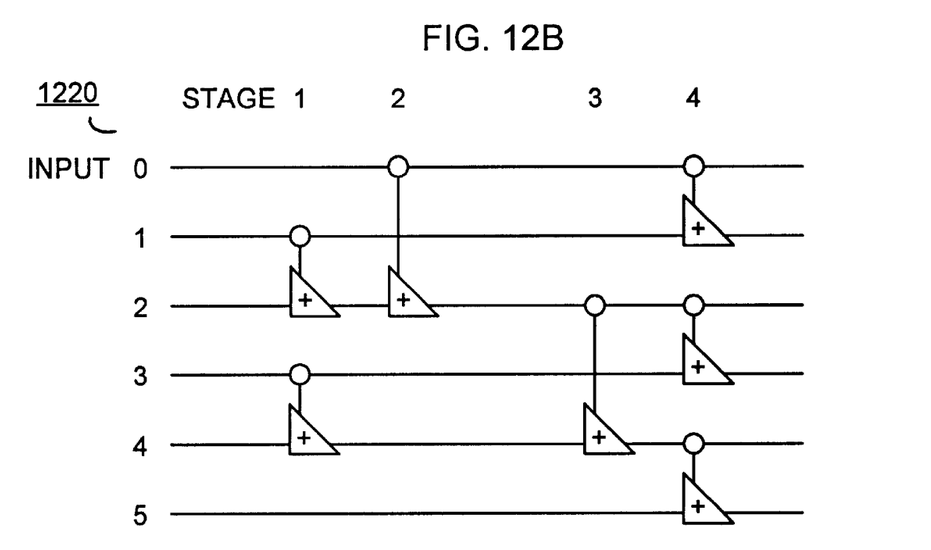

For example, as shown in FIG. 12, if 6×6 adder network 1220 (FIG. 12B) is required, start from 8×8 adder network 1200 (FIG. 12A) and remove the upper two lines (encompassed by elements within areas 1210 and 1201, respectively). By removing the first line, the three fan-out elements (1202, 1204, 1206) on this line (with coordinates (3,0), (4,0) and (5,0)) together with the three adder elements (1203, 1205, 1207) (with coordinates (3,4), (4,2) and (5,1)) whose N-inputs are connected to the S-outputs of the three removed fan-out elements are also removed. By removing the second line, the fan-out element (1208) at (1,1) and the adder element (1209) at (1,2) are removed. As stage 3 has no more adder or fan-out elements now, it is also removed. The resulting 6×6 adder network 1220 is shown in FIG. 12B.

4. Handling of Initial Value

Figure 13:
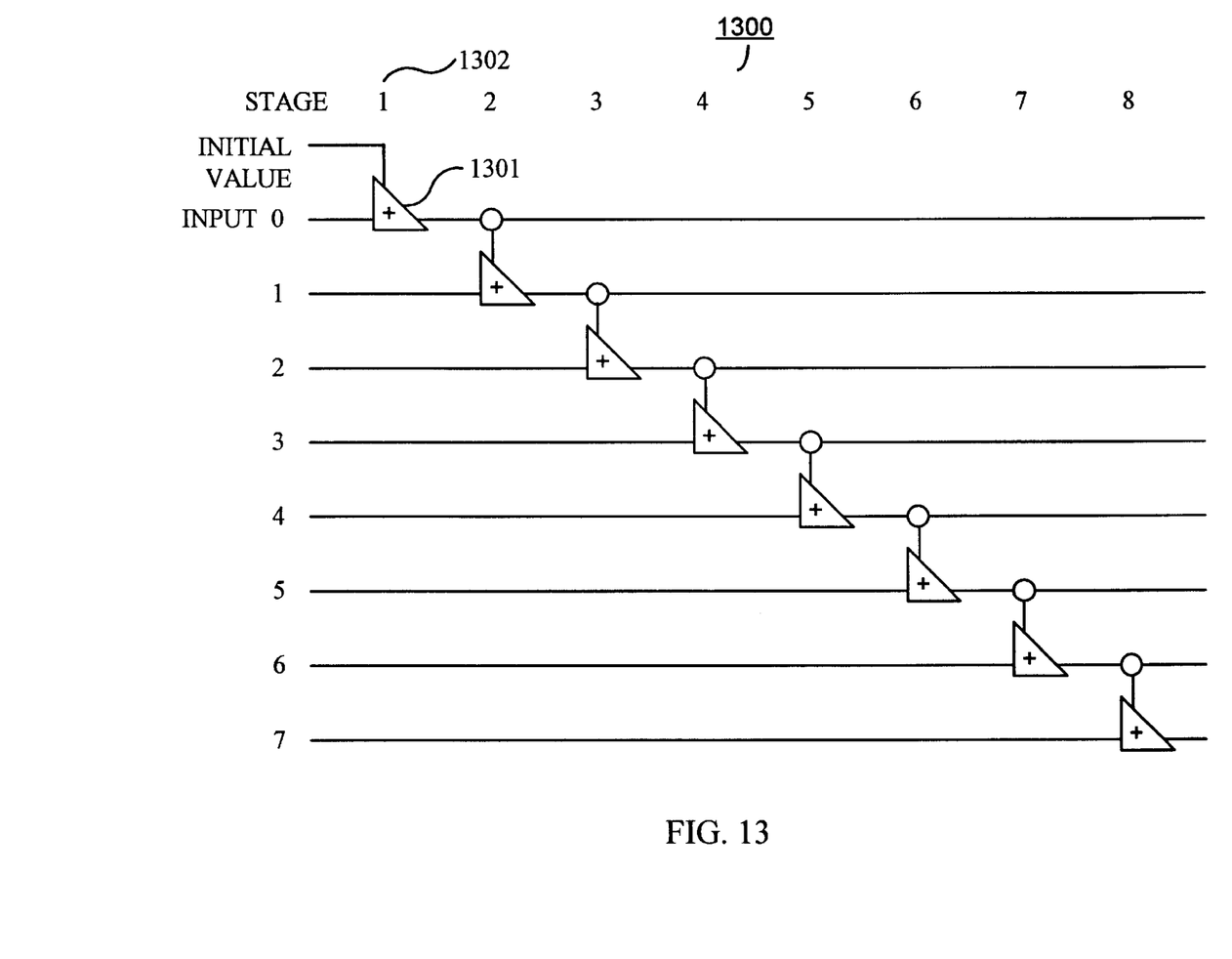
FIG. 13 shows that an additional stage is incurred when initial value is to be supported by a running-sum adder network using serial design for 8×8 running-sum adder network with initial value supported using serial design.
Figure 14:
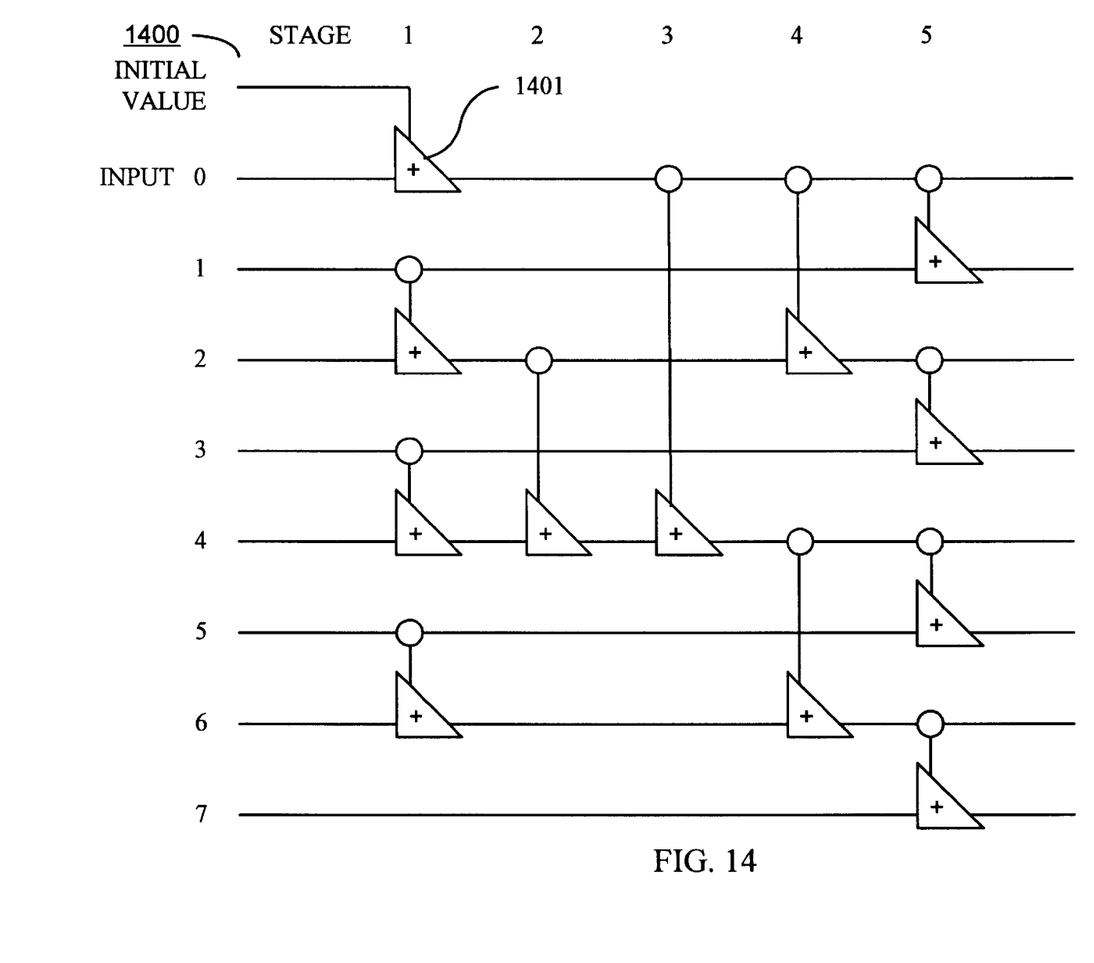
FIG. 14 illustrates how initial value is supported without incurring additional stage for 8×8 running-sum adder network with initial value supported.

In many applications, an initial value is required for the running-sum adder network. The adder network according to the present invention has advantage over other conventional designs when handling this case. When the adder network is $2^m \times 2^m$, the inventive design is especially advantageous. As most practical adder networks are $2^m \times 2^m$ networks, and most of the existing designs need to add one more stage just for adding a single adder element. For example, for all of the aforementioned serial and parallel designs, when dealing with the case of initial value, a new adder element must be placed on line 0 to sum the signal of initial value and the signal from input 0, and this element should be placed in front of, that is, on the left of, the first fan-out element on line 0 (strictly speaking, the adder element may not necessarily be placed in front of the first fan-out element, but if this is the case, two or more elements are required and this is may incur an additional stage). Therefore, this additional adder element on line 0 will inevitably incur one additional stage. FIG. 13 shows 8×8 adder network 1300 supporting initial value using serial design. It can be seen that the additional adder element (1301) incurs an additional stage (1302). In the implementation, however, an adder element can be placed at (1,0), as this position is always available. No additional stages are required. FIG. 14 shows designed 8×8 adder network 1400 supporting an initial value. The additional adder element (1401) is located at (1,0) and no additional stage is incurred.

Figure 15:
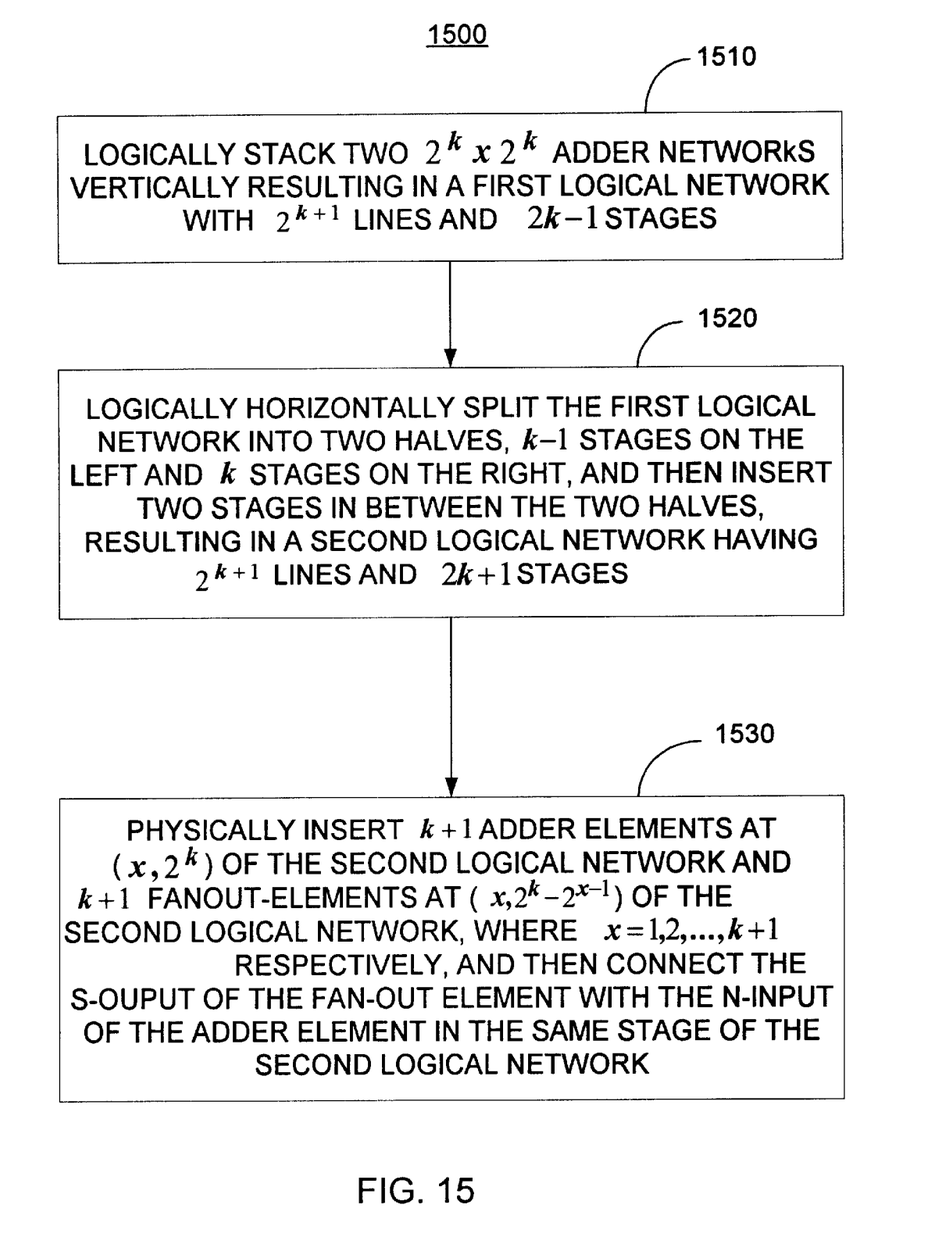
FIG. 15 is a flow diagram of the recursive construction algorithm to implement a running-sum adder.

The flow diagram of FIG. 15 depicts the inventive methodology carried out to derive the implementations of the running-sum adder in accordance with the present invention. The flow diagram of FIG. 15 depicts the steps as set forth earlier, namely:

Step 1510: Stack two $2^k \times 2^k$ adder networks vertically—the resulting first logical network has $2^{k+1}$ lines and 2k−1 stages;

Step 1520: Horizontally split the resulting first network into two halves, k−1 stages on the left and k stages on the right, and insert 2 stages in between. The resulting second logical network has $2^{k+1}$ lines and 2k+1 stages;

Step 1530: Place k+1 adder elements at $(x, 2^k)$ and k+1 fan-out elements at $(x, 2^k-2^{x-1})$, where x=1, 2, ..., $^{k+1}$1, respectively, and then connect the S-output of the fan-out element with the N-input of the adder element in the same stage.

The resulting network is the required $2^{k+1} \times 2^{k+1}$ adder network with 2k+1 stages and size $2^{k+2}-k-3$.

Although the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. A method for physically implementing a running-sum adder network comprising the steps of systematically selecting, based upon a prescribed mathematical algorithm, elements to physically realize the network, the algorithm being determined to satisfy the requirements of size of the network and the depth of the network, and interconnecting the selected elements to realize the network.

2. The method as recited in claim 1 wherein the network is a $2^{k+1} \times 2^{k+1}$ network, the given size of the network is $2^{k+2}-k-3$, and the step of systematically selecting includes the step of determining elements to configure the network with the given size.

3. The method as recited in claim 1 wherein the network is a $2^{k+1} \times 2^{k+1}$ network, the given depth of the network is 2k+1, and the step of systematically selecting includes the step of determining elements to configure the network with the given depth.

4. The method as recited in claim 1 wherein the network is a $2^{k+1} \times 2^{k+1}$ network, the given size of the network is $2^{k+2}-k-3$ and the given depth of the network is 2k+1, and the step of systematically selecting includes the step of determining elements to configure the network with the given size and the given depth.

5. The method as recited in claim 1 wherein the running-sum adder network is a $2^{k+1} \times 2^{k+1}$ adder network and the prescribed mathematical algorithm includes the steps of logically stacking two $2^k \times 2^k$ adder networks vertically resulting in a first logical network having have $2^{k+1}$ lines and 2k−1 stages, logically horizontally splitting the first logical network into two halves, k−1 stages on the left and k stages on the right, and then inserting two stages in-between the two halves, resulting in a second logical network having $2^{k+1}$ lines and 2k+1 stages, and physically inserting k+1 adder elements at $(x, 2^k)$ and k+1 fan-out elements at $(x, 2^k-2^{x-1})$, where x=1, 2, ..., k+1, respectively, and then connecting an output of each inserted fan-out element with an input of each inserted adder element in the same stage, thereby implementing the $2^{k+1} \times 2^{k+1}$ running-sum adder network having 2k+1 stages and size.

6. A method for physically implementing a running-sum adder network comprising the steps of systematically selecting, based upon a prescribed mathematical algorithm, elements to physically configure the network, the algorithm balancing both the size and depth of the network, and interconnecting the selected elements to realize the network.

7. The method as recited in claim 6 wherein the network is a $2^{k+1} \times 2^{k+1}$ network, the given size of the network is $2^{k+2}-k-3$, and the step of systematically selecting includes the step of determining elements to configure the network with the given size.

8. The method as recited in claim 6 wherein the network is a $2^{k+1} \times 2^{k+1}$ network, the given depth of the network $2^k+1$, and the step of systematically selecting includes the step of determining elements to configure the network with the given depth.

9. The method as recited in claim 6 wherein the network is a $2^{k+1} \times 2^{k+1}$ network, the given size of the network is $2^{k+2}-k-3$, and the given depth of the network is 2k+1, and the step of systematically selecting includes the step of determining elements to configure the network with the given size and the given depth.

10. A method for physically implementing a $2^{k+1} \times 2^{k+1}$ running-adder network comprising the steps of logically stacking two $2^k \times 2^k$ adder networks vertically resulting in a first logical network having have $2^{k+1}$ lines and 2k−1 stages, logically horizontally splitting the first logical network into two halves, k−1 stages on the left and k stages on the right, and then inserting two stages in-between the two halves, resulting in a second logical network having $2^{k+1}$ lines and 2k+1 stages, and physically inserting k+1 adder elements at $(x, 2^k)$ and k+1 fan-out elements at $(x, 2^k-2^{x-1})$, where x=1, 2, . . . , k+1, respectively, and then connecting the S-output of the fan-out element with the N-input of the adder element in the same stage of the second logical network, thereby implementing the $2^{k+1} \times 2^{k+1}$ running-sum adder network having 2k+1 stages and of size $2^{k+2}-k-3$.

11. The method as recited in claim 10 to account for an initial value, the method further comprising the steps of inserting an extra adder element line 0 to sum the initial value and a signal from input 0, and placing the extra adder element in front of a first fan-out element on line 0.

12. A method for physically implementing a running-sum adder network comprising the steps of systematically selecting, based upon a prescribed mathematical algorithm, elements to physically realize the network, the algorithm being determined to satisfy network design requirements, and interconnecting the selected elements to realize the network, said step of selecting including the step of referencing the size and the depth as network design requirements.

13. The method as recited in claim 12 wherein the network is a $2^{k+1} \times 2^{k+1}$ network, the given size of the network is $2^{k+2}-k-3$, and the step of systematically selecting includes the step of determining elements to configure the network with the given size.

14. The method as recited in claim 12 wherein the network is a $2^{k+1} \times 2^{k+1}$ network, the given depth of the network is 2k+1, and the step of systematically selecting includes the step of determining elements to configure the network with the given depth.

15. The method as recited in claim 12 wherein the network is $2^{k+1} \times 2^{k+1}$ network, the given size of the network is $2^{k+2}-k-3$ and the given depth of the network is 2k+1, and the step of systematically selecting includes the step of determining elements to configure the network with the given size and the given depth.

16. A method for physically implementing a $(2^k+j) \times (2^k+j)$ adder network comprising the steps of logically constructing a $2^{k+1} \times 2^{k+1}$ adder network, and removing the upper $2^k-j$ lines and the associated elements.

17. The method as recited in claim 16 wherein the step of removing includes the step of, whenever a line is removed, removing all primitive elements located on the line, as well as all adder elements not on the line but whose N-inputs are connected to the S-outputs of those fan-out elements located on the removed line.

18. The method as recited in claim 17 wherein the step of removing includes the step of removing any stage that does not have any adder or fan-out elements.

19. A $2^{k+1} \times 2^{k+1}$ running-sum adder network having 2k+1 stages comprising two $2^k \times 2^k$ adder networks stacked vertically resulting in a first sub-network having have $2^{k+1}$ lines and 2k−1 stages, two stages in-between two parts of the first sub-network, the parts obtained by splitting the first sub-network into k−1 stages on the left and k stages on the right, resulting in a second sub-network having $2^{k+1}$ lines and 2k+1 stages, and k+1 adder elements inserted at $(x, 2^k)$ and k+1 fan-out elements at $(x, 2^k-2^{x-1})$, where x=1, 2, . . . , k+1, respectively, with an output of each inserted fan-out element being connected with an input of each inserted adder element in the same stage.

20. The system as recited in claim 19 which accounts for an initial value, the system further comprising an extra adder element in line 0 for summing the initial value and a signal from input 0, the extra adder element being placed in front of a first fan-out element on line 0.

\* \* \* \* \*